July 2, 1935.  L. J. FUHRMANN  2,006,736
METHOD OF MAKING GLUE AND A PLASTIC MATERIAL AND PRODUCT THEREOF
Filed June 27, 1932
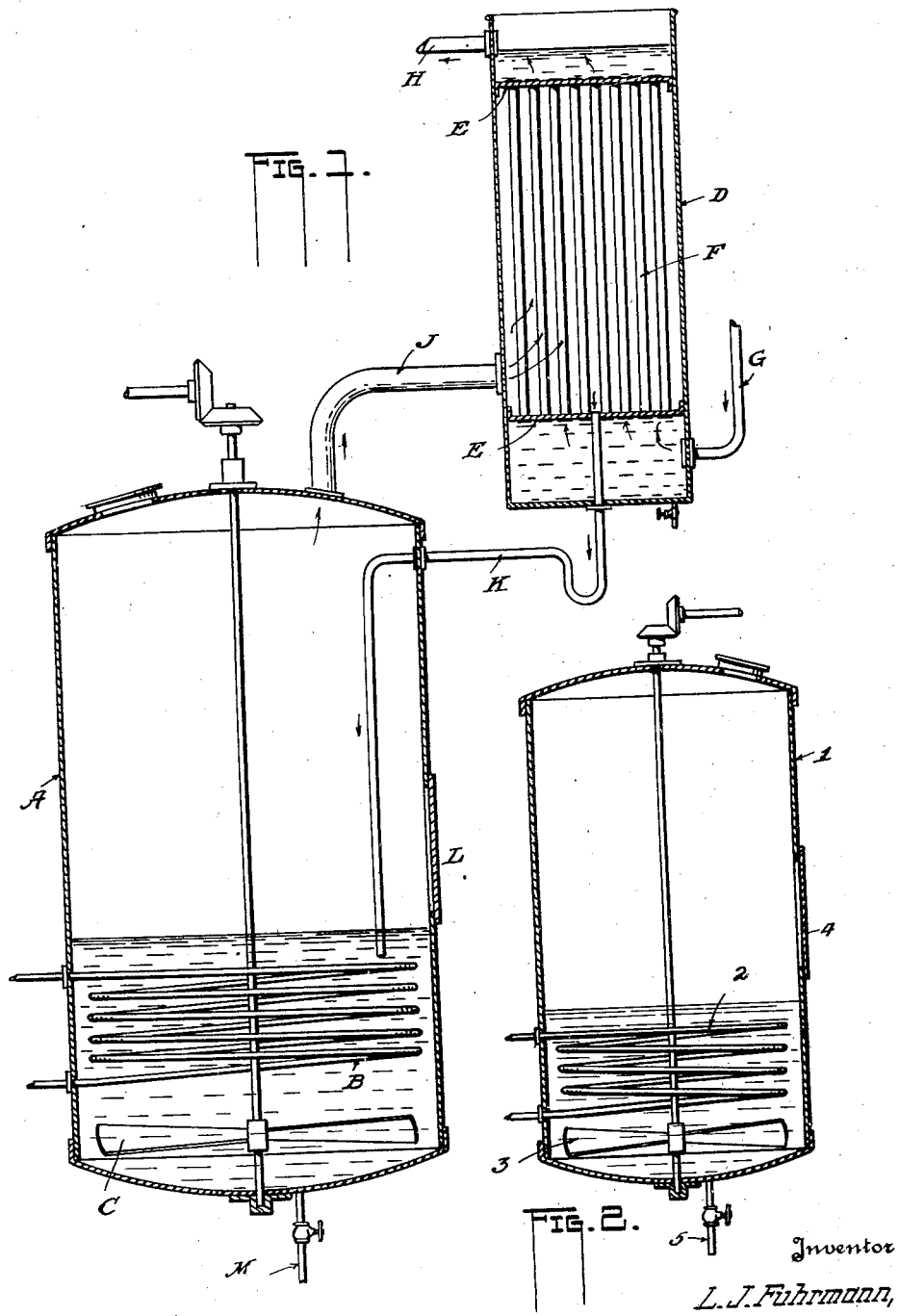
Inventor
L. J. Fuhrmann,
By
Attorney Patented July 2, 1935

2,006,736

UNITED STATES PATENT OFFICE 2,006,736

METHOD OF MAKING GLUE AND A PLASTIC MATERIAL AND PRODUCT THEREOF

Louis J. Fuhrmann, Peoria, Ill., assignor to Allied Mills, Inc., Chicago, Ill., a corporation of Illinois Application June 27, 1932, Serial No. 619,442

3 Claims. (Cl. 134—23.3)

This invention relates to a method of producing both a liquid glue and a plastic substance from vegetable protein material, and the product resulting from practicing such method.

An object of my invention is a method of treatment of vegetable protein material by which to produce a liquid glue suitable for use in the arts, that is extremely tenacious, non-inflammable, moisture resistant, that is insoluble in water, insoluble in organic or inorganic acids, and insoluble in alcohols or ethers.

A further object lies in producing a liquid glue from vegetable protein material wholly suited for many uses including making of ply-wood and for purposes of like nature, or where a good glue is needed requiring toughness and strength, and that is moisture resistant and insoluble in any known solvent, or mixtures thereof.

Another object is the production of a substance resulting from the treatment of vegetable protein material that when reduced to comparative dryness yields a substance that is extremely tough, unbreakable, non-inflammable, moisture and waterproof, and insoluble in known solvents or mixtures thereof, and that answers as an excellent dielectric.

Still another object is the production of a substance through treatment of vegetable protein material that when reduced to a plastic condition may be molded into various shapes, or placed in molds for creating articles of ornament or utility, and that after being dried that is unbreakable, is a non-conductor of the electric current and therefore suitable for making insulating parts for use in electric apparatus and fixtures.

In carrying out my method I employ any suitable type of closed apparatus, two forms of which, as examples, are illustrated in the accompanying drawing as an assistance in giving a full understanding of the steps employed in practicing my said method.

Figure 1 is a sectional elevation of a condenser and heating tank and their connections, and Figure 2 is a sectional elevation of a heater tank and a more simple type of device as compared with that shown in Figure 1.

I have found that certain vegetable proteins treated substantially in the manner to be described yield a material for producing an excellent glue, and which may be used for producing a plastic substance, both of which products enter into my invention. By long experiment I have determined that the vegetable proteins in certain substances such, for example, as cottonseed meal, or soy bean meal, can be treated for the production of the named products, flour made from soy bean oil cake being particularly suitable for the purpose. Soy bean oil cake is, in fact, an admirable material for such purpose, the oil having been removed from the bean, of course, by any of the approved ways such as by expressing or by the use of solvents, followed by grinding the oil cake into flour, these preliminary steps, however, in no way entering into my invention since old and well known.

My experience has shown that when the vegetable protein of soy bean flour is treated with an alkali, such as barium hydroxide, alkali carbonate, or preferably potassium hydroxide or sodium hydroxide, especially the former of the last two named hydroxides, and kept in this state for some time at ordinary temperature, and afterward boiled for about sixty minutes at a temperature of approximately 195° Fahrenheit with a phenol and formaldehyde mixture an adhesive solution is obtained suitable as a glue. In using the hydroxide the colloidal substance is dispersed and the phenol formaldehyde mixture dissolves the alkaline substance at the named temperature of approximately 195° F., converting the mixture into a clear and very fine liquid glue that when preserved in air tight containers will not deteriorate and will retain its liquid state indefinitely.

Further, a plastic substance may be formed by evaporating the resultant glue sufficiently to produce a plastic mass which lends itself to ready shaping into desired forms, or of being placed in molds, whereupon by further drying or baking the previously named articles are produced.

Upon analysis, soy bean oil cake is found to contain the following in about the proportions named, i. e., 42% protein, 10% moisture, 7% crude fiber, 5.5% fat, and 27% nitrogen-free extract.

Soy bean flour made from the oil cake is preferably used in practice since it can be handled at a lower cost than the whole bean and of importance is the fact that it makes a better glue and consequently a better plastic substance by reason of the reduced oil content.

The following steps are used in practice and substantially in the manner described:

In making the glue I first make a mixture of approximately 60 parts of soy bean flour preferably of a grade that will pass through a 60 or an 80 mesh sieve, and 100 parts of a 10% solution of potassium hydroxide. This is allowed to stand for from fifteen to twenty hours at ordinary temperature to permit the whole to digest ready for the treatment to follow. This preliminary treatment of the mixture hydrolizes the protein or colloidal material by the use of the potassium of which the named 10% has been found to be the best strength for the purpose. It has been found, also, that the material must stand for at least fifteen hours for complete digestion otherwise the resultant adhesive will not be as strong as it is possible to have it, in addition to which the product in the final treatment will present a very poor appearance due to being more or less cloudy and unsuited for display objects due to such appearance.

After the expiration of the said period of from fifteen to twenty hours I incorporate with the mixture 80 parts of a 55% solution of phenol and about 60 parts of a 40% solution of formaldehyde following which the entire mass is thoroughly mixed and kept in agitation in a closed vessel, while boiling, for approximately sixty minutes at about 195° Fahrenheit, the addition of the phenol resulting in the production of a clear mixture wholly transparent, besides being of greater bulk due to the long period of digestion than could otherwise be realized from the same amount of materials. The chemical action is not quite known to the chemist at any rate the result is the desired unclouded material and the transparent final product.

The bean flour is preferably employed from the fact that faster action is had than with a coarse bean meal. Again, the boiling temperature of at least 195° F. is desirable merely in the interest of saving of time.

As an example of an apparatus suitable for my use, Figure 1 illustrates a vessel A having a heating coil B therein, and provided with an agitator C. A reflux condenser is denoted at D, being provided with heads E, for example, extending through and between which are water tubes F. Cooling water enters the space beneath the tubes, through a pipe G, and flows upwardly through the tubes overflowing at the pipe H. The vessel A is connected at its top with the space between the heads E by a vapor pipe J, while a return pipe K from the said space between the heads E leads back into the said vessel. The material under treatment may be placed in the vessel through any opening as L, for example, the vapors passing to the condenser and returning without loss, a draw-off pipe being shown at M for the outlet of the finished glue.

Again, I show in Figure 2 a tank 1 having a heating coil 2, and an agitator 3. In the use of this form the materials are all held in the one piece of apparatus, an opening 4 being provided for charging, and a pipe 5 may be supplied for discharge purposes.

After the material has been boiled for about the period of time stated it is ready to be drawn off and may be placed in suitable containers for use, and is a clear substance having no residue or settlings.

If a too weak phenol solution is used the particles of alkaline treated material are not completely dissolved, while if the percentage of phenol is too high, the resultant glue dries very fast and tends to brittleness.

In order, now, to produce the described plastic material the thus finished glue substance may be exposed to the air until it dries to a plastic condition suitable for working into shape, or as a matter of time saving it may be subjected to heat and thus more rapidly dried. When sufficient moisture is driven off it may be worked into the form desired or it can be poured or pressed into molds and then dried, or again, it may be baked in the moulds at about 160° Fahrenheit.

In the known methods in the present art the matter of a time interval has not been considered between any of the steps during the treatment of the vegetable matter for the purpose of enriching or improving the quality of the final product. In my method, however, due to the materials used and because of the effect that can be produced an interval of time between the steps as outlined is of great advantage, and in fact wholly necessary in obtaining the final result pointed out. When the product is dried beyond the glue stage for a plastic it is necessarily of fine appearance since wholly clear and transparent due to the complete digestion of the materials in the early stage of treatment. It follows, therefore, that if a better glue results because of such complete digestion the dried product must also be better.

In the foregoing, the terms "wholly clear" and "transparent" are obviously directed to persons familiar with the adhesive art and these words are not intended to describe the product as crystal clear in the sense that water is clear. On the other hand, these expressions mean that the product is of even consistency and without perceptible grain or particles even though somewhat brownish in color. The product is marked by a freedom from suspended or other noticeable particles and in that sense is clear.

I claim:

1. In a method of making glue from vegetable protein material, the method which includes mixing substantially 60 parts vegetable protein material with 100 parts of a 10% sodium hydroxide solution, and after a period of from fifteen to twenty hours during which the proteins are permitted to hydrolyze, adding thereto substantially 80 parts of a 55% phenol and substantially 60 parts of 40% formaldehyde, mixing the whole, and boiling the same out of the presence of air for approximately sixty minutes at substantially 195° F. while under agitation.

2. In a method of making an adhesive compound from vegetable protein material, the steps which consist in mixing vegetable protein flour with a potassium hydroxide solution, allowing the mixture to stand for a period of from fifteen to twenty hours to permit the protein or colloidal material to hydrolize completely, and after the named period thoroughly incorporating with the mixture a solution of phenol and formaldehyde, and boiling the whole for approximately sixty minutes at about 195° Fahrenheit.

3. In a method of making an adhesive substance from vegetable protein material, the method which includes mixing substantially 60 parts of vegetable protein flour with substantially 100 parts of a 10% potassium hydroxide solution, permitting the mixture to become wholly hydrolized during a period of from fifteen to twenty hours, and then adding thereto substantially 80 parts of a 55% solution of phenol, and substantially 60 parts of a 55% solution of formaldehyde, and boiling the same for approximately sixty minutes at 195° Fahrenheit.

LOUIS J. FUHRMANN.